(12) United States Patent
Keskar et al.

(10) Patent No.: US 7,754,183 B2
(45) Date of Patent: Jul. 13, 2010

(54) PROCESS FOR PREPARING CARBON NANOSTRUCTURES WITH TAILORED PROPERTIES AND PRODUCTS UTILIZING SAME

(75) Inventors: Gayatri D. Keskar, Clemson, SC (US); Wei Wang, Pittsburgh, PA (US); Apparao M. Rao, Anderson, SC (US)

(73) Assignee: Clemson University Research Foundation, Anderson, SC (US)

( * ) Notice: Subject to any disclaimer, the term of this patent is extended or adjusted under 35 U.S.C. 154(b) by 1200 days.

(21) Appl. No.: 11/134,052

(22) Filed: May 20, 2005

(65) Prior Publication Data

US 2010/0015033 A1    Jan. 21, 2010

(51) Int. Cl.
D01C 5/00 (2006.01)
D01F 9/12 (2006.01)

(52) U.S. Cl. .............. 423/447.3; 423/447.1; 423/447.2; 977/842; 977/843

(58) Field of Classification Search .............. 423/447.3, 423/447.1–447; 977/842–843
See application file for complete search history.

(56) References Cited

U.S. PATENT DOCUMENTS

| | | | |
|---|---|---|---|
| 4,816,289 A | 3/1989 | Komatsu et al. | |
| 5,300,203 A | 4/1994 | Smalley | |
| 5,401,975 A | 3/1995 | Ihara et al. | |
| 5,618,875 A | 4/1997 | Baker et al. | |
| 5,872,422 A | 2/1999 | Xu et al. | |
| 6,157,043 A | 12/2000 | Miyamoto | |
| 6,221,330 B1 | 4/2001 | Moy et al. | |
| 6,297,063 B1 | 10/2001 | Brown et al. | |
| 6,325,909 B1 | 12/2001 | Li et al. | |
| 6,333,016 B1 | 12/2001 | Resasco et al. | |
| 6,350,488 B1 | 2/2002 | Lee et al. | |
| 6,361,861 B2 | 3/2002 | Gao et al. | |
| 6,401,526 B1 * | 6/2002 | Dai et al. | 73/105 |
| 6,445,006 B1 | 9/2002 | Brandes et al. | |
| 6,451,175 B1 | 9/2002 | Lal | |
| 6,495,258 B1 | 12/2002 | Chen et al. | |
| 6,555,945 B1 | 4/2003 | Baughman et al. | |

(Continued)

OTHER PUBLICATIONS

Li, et al., Large-Scale Synthesis of Aligned Carbon Nanotubes, Science 1996; 274: 1701-1703.*
Terrones, et al., Efficient route to large arrays of CNx nanofibers by pyrolysis of ferrocene/melamine mixtures, Applied Physics Letters 1999; 75(25): 3932-3934.*

(Continued)

Primary Examiner—Stanley S. Silverman
Assistant Examiner—Daniel C. McCracken
(74) Attorney, Agent, or Firm—Dority & Manning, P.A.

(57) ABSTRACT

The present invention discloses a relatively simple CVD method for forming specifically tailored carbon-based nanostructures. In general, the method is a chemical vapor deposition method in which at least a portion of the precursor materials are provided as a liquid at atmospheric conditions. The precursor materials include at least one carbon source and at least one catalyst source. Optionally, the precursor materials can also include one or more dopant sources. The carbon source and the optional dopant source can be injected as liquids into the system, and the liquid catalyst source can be either injected into the system or located on a substrate in the reactor prior to the process. Very high yield of nanostructures exhibiting particular characteristics can be attained by the process. Control of electrical characteristics as well as structural characteristics of the products are possible via control of process parameters including the particular precursors used as well as the relative amounts of the precursors used.

20 Claims, 9 Drawing Sheets

U.S. PATENT DOCUMENTS

| | | | |
|---|---|---|---|
| 6,558,645 B2 * | 5/2003 | Nakayama et al. | 423/445 B |
| 6,583,085 B1 | 6/2003 | Nakayama et al. | |
| 6,596,187 B2 | 7/2003 | Coll et al. | |
| 6,605,266 B2 | 8/2003 | Nesper et al. | |
| 6,709,566 B2 | 3/2004 | Cumings et al. | |
| 6,735,046 B2 | 5/2004 | Nakayama et al. | |
| 6,759,025 B2 | 7/2004 | Hong et al. | |
| 6,869,581 B2 | 3/2005 | Kishi et al. | |
| 6,874,668 B2 | 4/2005 | Cumings et al. | |
| 6,887,365 B2 | 5/2005 | Naughton | |
| 7,014,830 B2 | 3/2006 | Nakayama et al. | |
| 7,160,531 B1 * | 1/2007 | Jacques et al. | 423/447.3 |
| 7,405,178 B2 | 7/2008 | Li et al. | |
| 7,651,668 B2 | 1/2010 | Nakayama et al. | |
| 2002/0102353 A1 | 8/2002 | Mauthner et al. | |
| 2002/0163414 A1 | 11/2002 | Mayer et al. | |
| 2002/0172639 A1 | 11/2002 | Horiuchi et al. | |
| 2002/0179564 A1 | 12/2002 | Geobegan et al. | |
| 2003/0004058 A1 | 1/2003 | Li et al. | |
| 2003/0089899 A1 | 5/2003 | Lieber et al. | |
| 2003/0106998 A1 | 6/2003 | Colbert et al. | |
| 2003/0118727 A1 | 6/2003 | Ting et al. | |
| 2003/0161950 A1 | 8/2003 | Ajayan et al. | |
| 2003/0165418 A1 | 9/2003 | Ajayan et al. | |
| 2004/0101685 A1 | 5/2004 | Fan et al. | |
| 2004/0129447 A1 | 7/2004 | Beeli et al. | |
| 2004/0265212 A1 | 12/2004 | Varadan et al. | |
| 2005/0238566 A1 * | 10/2005 | Rao et al. | 423/447.3 |
| 2007/0037370 A1 | 2/2007 | Suekane et al. | |
| 2007/0098622 A1 | 5/2007 | Nakayama et al. | |

OTHER PUBLICATIONS

Sen, et al., B—C—N, C—N, and B—N nanotubes produced by the pyrolysis of precursor molecules over Co catalysts, Chemical Physics Letters 1998; 287: 671-676.*
Nath, et al., Production of bundles of aligned carbon and carbon-nitrogen nanotubes by the pyrolysis of precursors on silica-supported iron and cobalt catalysts, Chemical Physics Letters 2000; 322: 333-340.*
Mayne, et al., Pyrolitic production of aligned carbon nanotubes from homogeneously dispersed benzene-based aerosols, Chemical Physics Letters 2001; 338: 101-107.*
B. Kitiyanan, et al., Controlled production of single-wall carbon nanotubes by catalytic decomposition of CO on bimetallic Co—Mo catalysts, Chemical Physics Letters 2000; 317: 497-503.*
Iijima, et al., Single-shell carbon nanotubes of 1-nm diameter, Nature 1993; 363: 603-605.*
Ebbesen, et al., Large-scale synthesis of carbon nanotubes, Nature 1992; 358: 220-222.*
Dresselhaus, et al., Raman spectroscopy on isolated single wall carbon nanotubes, Carbon 2002; 40: 2043-2061.*
Vivekchand, et al, Carbon nanotubes by nebulized spray pyrolysis, Chemical Physics Letters 2004; 386: 313-318.*
Article—*Branching carbon nanotubes deposited in HFCVC system*, Bo Gan, J. Ahn, Qing Zhang, S. F. Yoon, Rusli, Q.-F. Huang, H. Yang, M.-B. Yu, and W.-Z. Li, Diamond and Related Materials, vol. 9, 2000, pp. 897-900.
Article—*Complex branching phenomena in the growth of carbon nanotubes*, Dan Zhou and Supapan Seraphin, Chemical Physics Letters, vol. 238, Jun. 2, 1995, pp. 286-289.
Article—*Controlled Growth of Y-Junction Nanotubes Using Ti-Doped Vapor Catalyst*, N. Gothard, C. Daraio, J. Gaillard, R. Zidan, S. Jin, and A. M. Rao, Nano Letters, vol. 0, No. 0, pp. A-E.
Article—*Electronic Transport in Y-Junction Carbon Nanotubes*, C. Papadopoulos, A. Rakitin, J. Li, A. S. Vedeneev, and J. M. Xu, Physical Review Letters, vol. 85, No. 16, Oct. 16, 2000, pp. 3476-3479.
Article—*Growing Y-junction carbon nanotubes*, Jing Li, Chris Papadopoulos, and Jimmy Xu, Nature, vol. 402, Nov. 18, 1999, pp. 253-254.
Article—*Straight carbon nanotube Y junctions*, W. Z. Li, J. G. Wen, and Z. F. Ren, Applied Physics Letters, vol. 79, No. 12, Sep. 17, 2001, pp. 1879-1881.
Article—*Synthetic Strategies for Y-junction carbon nanotubes*, F. L. Deepak, A. Govindaraj, and C. N. R. Rao, Chemical Physics Letters, vol. 345, Sep. 7, 2001, pp. 5-10.
Article—*Y-junction carbon nanotubes*, B. C. Satishkumar, P. John Thomas, A. Govindaraj, and C. N. R. Rao, Applied Physics Letters, vol. 77, No. 16, Oct. 16, 2000, pp. 2530-2532.
Abstract of article entitled *Conductivity enhancement in single-walled carbon nanotube bundles with K and Br*, Lee et al., Nature, vol. 388, Jul. 17, 1997, pp. 255-257.
Abstract of article entitled *Electrical transport in pure and boron-doped carbon nanotubes*, Wei et al., Applied Physics Letters, vol. 74, Issue 21, May 24, 1999, pp. 3149-3151.
Abstract of article entitled *Nonlinear Coherent Transport Through Doped Nanotube Junctions*, Farajian et al., Phys. Rev. Lett., vol. 82, Issue 35, Jun. 21, 1999, pp. 5084-5087.
Abstract of article entitled *Polymerized carbon nanobells and their field-emission properties*, Ma et al., Applied Physics Letters, vol. 75, Issue 20, Nov. 15, 1999, pp. 3105-3107.
Article—*Adjustable boron carbonitride nanotubes*, Zhi et al., Journal of Applied Physics, vol. 91., No. 8, Apr. 15, 2002, pp. 5325-5333.
Article—*B—C—N, C—N and B—N nanotubes produced by the pyrolysis of precursor molecules over Co catalysts*, Sen et al., Chemical Physics Letters, vol. 287, May 8, 1998, pp. 671-676.
Article—*Boron-doped carbon nanotubes prepared through a substitution reaction*, Han et al., Chemical Physics Letters, vol. 299, Jan. 16, 1999, pp. 368-373.
Article—*Electronic structures and optical properties of boron coped single-wall carbon nanotubes*, Pichler et al., AIP Conference Proceedings, vol. 685(1), Oct. 20, 2003, pp. 361-365.
Article—*First-principles calculations for nitrogen-containing single-walled carbon nanotubes*, Zhao et al., Journal of Applied Physics, vol. 94, No. 4, Aug. 15, 2003, pp. 2398-2402.
Article—*Scanning tunneling microscopy observation of tightly wound, single-wall coiled carbon nanotubes*, Biró et al., Europhysics Letters, vol. 50, No. 4, May 15, 2000, pp. 494-500.
Article—*Single-walled B-doped carbon, B/N-doped carbon and BN nanotubes synthesized from single-walled carbon nanotubes through a substitution reaction*, Golberg et al., Chemical Physics Letters, vol. 308, Jul. 23, 1999, pp. 337-342.
Article—*Synthesis of individual single-walled carbon nanotubes on patterned silicon wafers*, Kong et al., Nature, 1998, 4 pages.
Article—*Synthesis of N-doped SWNT using the arc-discharge procedure*, Glerup et al., Chemical Physics Letters, vol. 387, 2004, pp. 193-197.
Andrews, et al., "Continuous production of aligned carbon nanotubes: a step closer to commercial realization", *Chemical Physics Letters*, 303 (1999), pp. 467-474.
Azoulay, et al., "Polarised spectroscopy of individual single-walled nanotubes: Radial-breathing mode study", *Europhysics Letters*, vol. 53 (3), pp. 407-413 (2001).
Bachilo, et al., Structure-Assigned Optical Spectra of Single-Walled Carbon Nanotubes, *Science*, vol. 298, Dec. 2002.
Bandow, et al., "Effect of the Growth Temperature on the Diameter Distribution and Chirality of Single-Wall Carbon Nanotubes", *The American Physical Society*, vol. 80, No. 17, Apr. 27, 1998.
Dresselhaus, et al., "Raman spectroscopy on isolated single wall carbon nanotubes", *Carbon*, vol. 40, (2002), pp. 2043-2061.
Dresselhaus, et al., "Polarized Raman Study of Single-Wall Semiconducting Carbon Nanotubes", *Physical Review Letters*, vol. 85, No. 12, pp. 2617-2620 (2002).
Maultzsch, et al., "Radial breathing mode of single-walled carbon nanotubes: Optical transition energies and chiral-index assignment", *Physical Review B*, vol. 72, 205438 (2005).
Rao, et al., "Polarized Raman Study of Aligned Multiwalled Carbon Nanotubes", *Physical Review Letters*, vol. 84, No. 8, pp. 1829-1823, (2000).
Rao, et al., "Diameter-Selective Raman Scattering from Vibrational Modes in Carbon Nanotubes", *Science*, Vo. 275, pp. 187-191 (1997).

\* cited by examiner

PROCESS FOR PREPARING CARBON NANOSTRUCTURES WITH TAILORED PROPERTIES AND PRODUCTS UTILIZING SAME

FEDERALLY SPONSORED RESEARCH AND DEVELOPMENT

The United States Government may have rights in this invention pursuant to National Science Foundation Grant No. NSF NIRT 0304019.

BACKGROUND OF THE INVENTION

Advances in technologies associated with electrical circuitry have led to great improvements in many fields. For example, the miniaturization of transistors has enabled computational speeds and data storage capacities for computers that were considered impossible only a few years ago.

The field of nanotechnology, involving materials formed and utilized on a nanometer scale, has developed over the last several years as the next step in the ongoing attempt to further miniaturize materials. Some of the most exciting materials to be discovered in the field of nanotechnology are carbon-based nanostructures including single-walled nanotubes (SWNT), multi-walled nanotubes (MWNT), and solid carbon nanowires. Carbon-based nanostructures exhibit many desirable properties including high tensile and mechanical strength, good flexibility, large surface area, light weight per unit length, high thermal conductivity, the capacity to conduct very high current densities, e.g., exceeding $10^7$ A/cm$^2$, and, in the particular case of SWNT, the capacity to be either metallic or semiconducting, depending on chirality of the structure.

The properties of carbon nanostructures make them excellent candidates for incorporation into many devices. Unfortunately, high yield methods for forming quantities of carbon nanostructures having particular electrical or structural characteristics have proven difficult and expensive to develop. For example, methods that have been developed to form isolated SWNT (as opposed to, for instance, a mat, a felt, or a rope of SWNT) have often involved the formation and utilization of a particularly patterned substrate (see, for example, 'Synthesis of individual single-walled carbon nanotubes on patterned silicon wafers'. Kong, et al., *Nature*, 395, pp. 878-881 (Oct. 29, 1998)). Similarly, methods for forming nanostructures having a particular shape, for instance nanostructures that are coiled along their axial length, are generally quite complicated, with little control as to particular product characteristics. For instance, Nakayama, et al. (U.S. Pat. No. 6,558,645), disclose a formation method for producing nanocoils. The reference teaches a fairly high yield of nanocoils (e.g., 95%), but the process calls for pre-formation of complicated nucleating particles, which increases costs. In addition, many known processes that can form particularly shaped nanotubes or nanowires form the desired product materials mixed with MWNTs of other shapes, adding an additional separation step to the process in order to obtain any amount of the desired product in a purified state.

Moreover, as the ability to produce large quantities of nanostructures having particular characteristics has proven so difficult, the incorporation of such structures into useful end products has been slow to develop as well. In fact, due to the difficulties associated with forming particularly tailored nanostructures in bulk, many such materials have yet to be examined in detail, and characteristics of the materials, for instance the electrical characteristics of many structures, have yet to be fully understood. The ability to form in bulk nanostructures that have been tailored to a specific design could lead to a better understanding of the characteristics of the materials, which could in turn open the door to uses for these materials that have not previously been considered to be possible.

What is needed in the art is a relatively simple method for producing carbon-based nanostructures that can offer a high degree of control to the production process, in order to provide high yields of essentially identical nanostructures. In addition, what is need in the art is a method that can be easily adapted, providing a relatively simple route for tailoring the characteristics of the product nanostructures to meet predetermined specifications.

SUMMARY OF THE INVENTION

In one embodiment, the present invention is directed to a method for forming carbon-based nanostructures. The disclosed process includes utilization of one or more precursor materials that can be provided as a liquid at atmospheric condition. For example, the process utilizes at least one catalyst-containing precursor and at least one carbon-containing precursor both of which can be provided as liquid at atmospheric condition. According to the process, the liquid precursors can be vaporized and can decompose to form elemental catalyst and elemental carbon which can then form the desired carbon-based nanostructures according to a chemical vapor deposition (CVD) process. For instance, the nanostructures can form via a CVD process on a substrate located in the reactor.

In one embodiment, the catalyst-containing liquid precursor can be applied to the substrate prior to vaporization. In another embodiment, the catalyst-containing liquid precursor can be injected into the system, either along with or separately from the carbon-containing liquid precursor. In particular, if the two materials are immiscible, they can be injected into the system separately.

The method can be easily controlled to form nanostructures with predetermined and well-defined characteristics. For example, in one embodiment, the process can be used to form isolated single-walled carbon nanotubes. In another embodiment, the process can be used to form helically-coiled nanostructures. In addition, depending on the variable process conditions, the process can be used to form either helically-coiled nanotubes or helically-coiled nanowires, as desired.

In one embodiment, the method can be used to form a plurality of doped carbon-based nanostructures. For example, the method can form substitutionally doped single-walled carbon nanotubes. According to this embodiment, a dopant-containing precursor material that can be liquid at atmospheric conditions can also be provided along with the liquid carbon-containing precursor and the liquid catalyst-containing precursor. The dopant-containing precursor material, upon vaporization and decomposition, can provide the elemental dopant that can be incorporated into the walls of the nanostructures during the CVD process. For example, nanostructures can be formed according to the process that are substitutionally doped with boron or nitrogen.

If desired, additional precursor materials can be provided. For example, additional carbon-containing precursor materials can be provided that can be either liquid or gas at atmospheric conditions.

Optionally, a second catalyst-containing precursor can be provided. Upon decomposition of the second catalyst-containing precursor, the two (or more) elemental catalysts can combine to form a multi-component catalyst, providing a simple route to formation of carbon-based nanostructures having predetermined electrical and/or structural characteristics. For example, in one particular embodiment, the first elemental catalyst can be iron and the second elemental catalyst can be indium, and helically-coiled nanostructures can be formed by the process. Moreover, depending upon the relative proportions of the two catalysts provided to the system, the process can be controlled to form either helically-coiled nanotubes or helically-coiled nanowires, as desired.

The present invention is also directed to products that can incorporate the disclosed carbon-based nanostructures. For example, in one embodiment, the invention is directed to devices that include carbon-based nanostructures that can exhibit predetermined, stable electrical characteristics at atmospheric condition. In particular, the devices incorporate nanostructures that can exhibit predetermined electrical characteristic such as one or more of thermoelectric characteristics, resistivity, and the like.

In one particular embodiment, devices of the invention can incorporate one or more single-walled carbon nanotubes that exhibits stable n-type characteristics at atmospheric conditions.

Devices of the invention can optionally include multiple nanostructures, each of which can exhibit predetermined characteristics that can be the same or different from one another. For example, the device can include two or more single-walled carbon nanotubes, at least one exhibiting stable n-type characteristics at atmospheric conditions and at least one exhibiting stable p-type characteristics at atmospheric conditions. Devices encompassed by this embodiment of the present invention include, for example, nano-sized field effect transistors, diodes, transistors, complementary logic circuits, and the like.

Other devices encompassed by the invention include, for example, those that can incorporate helically-coiled nanostructures for instance as a nano-sized spring, inductor, connector or cantilever.

The invention is also directed to composite materials that incorporate a plurality of helically-coiled nanostructures dispersed in a matrix, for example as reinforcement in a polymeric matrix.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment may be used in another embodiment to yield a still further embodiment. Thus, it is intended that the present invention cover such modifications and variations as come within the scope of the appended claims and their equivalents.

The present invention is generally directed to a relatively simple method for forming nanostructures that is quickly and easily adaptable and affords excellent control over the process. As such, the process also affords excellent control over the particular characteristics of the nanostructures formed according to the process. The invention is also directed to the nanostructures that can be formed according to the disclosed process. In one particular embodiment, the invention is directed to nanostructures having tailored properties and characteristics. The invention is also directed to a variety of secondary products that can incorporate the disclosed nanostructures.

The presently disclosed process describes a chemical-vapor deposition (CVD) method. The method is relatively simple and easily adaptable while providing good control over the process for at least the reason that many of the precursor materials used in the process can be provided as a liquid at atmospheric conditions. In particular many, and in some embodiments, all, of the precursor materials can be provided as a liquid at atmospheric conditions. For purposes of this disclosure, the term "atmospheric condition" is herein defined to include conditions that one may reasonably expect to encounter under laboratory, manufacturing, or operating conditions for the processes and products as herein described. In particular, the term is intended to include ambient temperature and pressure. As such, atmospheric fluctuations with regard to local conditions (altitude, weather, temperature, etc.) are included in the concept of atmospheric condition.

Because the disclosed processes utilize liquids, the relative concentrations of the precursor materials can be more easily controlled, providing a tighter control capability to the process as compared to many previously known carbon-based nanostructure formation processes which use primarily gas and/or solid precursor materials. In addition, the process can allow the reactive constituents to be altered in both relative concentration and overall make-up during the course of the process, providing a route to the formation of unique nanostructures that vary in characteristics along the axial length of the materials.

Figure 1:
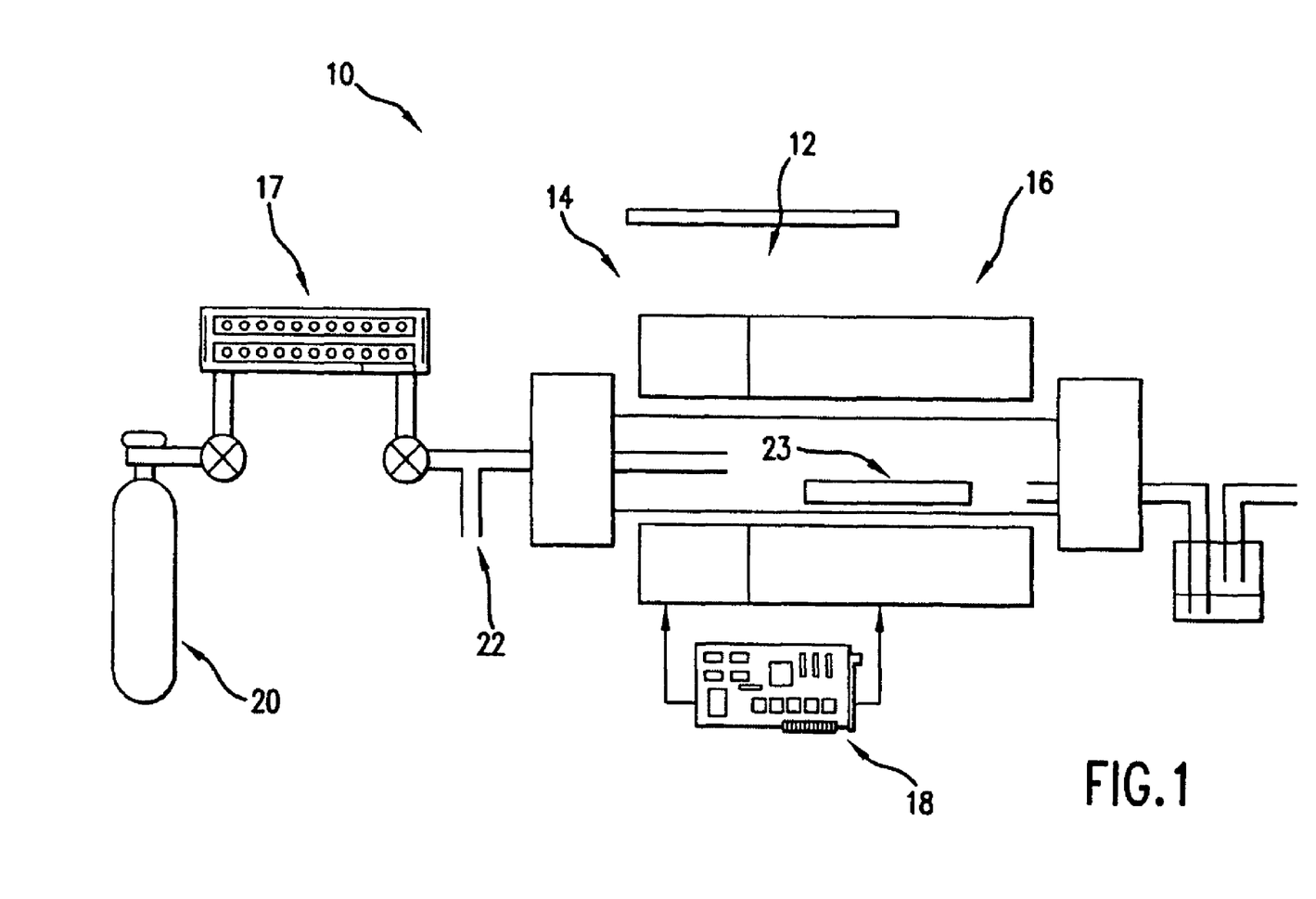
FIG. 1 is a schematic diagram of one embodiment of a reactor system that can be utilized for the disclosed process.

FIG. 1 illustrates one embodiment of a system generally 10 that can be utilized in the disclosed processes. In this particular embodiment, system 10 includes a two-stage furnace 12 that can be controlled such as by temperature controller 18 to provide both a preheater 14 and a reactor 16 within the furnace 12. The preheater 14 and the reactor 16 can be independent heating zones within a single furnace, as shown, or optionally can be two separate furnaces, i.e., a first preheater furnace and a second reactor furnace. In another embodiment, the furnace may include only a reactor, with no preheater required. Other standard process control measures and devices as are generally known in the art, such as mass flow controller 17, for example, can be included with the system 10 to aid in control of the process. Suitable manual and/or automatic control devices are generally known in the art, and thus are not discussed in detail herein.

A carrier gas flow can be supplied to the system 10, such as via tank 20, to provide a flow to carry precursor materials into the furnace 12. In one embodiment, the carrier gas can be an inert gas, such as argon. A carrier flow of inert gas is not a requirement of the present invention, however, and in other embodiments the carrier gas can be formed or combined with other, more reactive materials. For example, in one embodiment, the carrier gas can include hydrogen, the presence of which has been shown to enhance the production of the nanostructures while minimizing build-up of amorphous carbon within the reactor 16. In another embodiment, discussed in more detail below, the carrier gas can include one or more carbon-containing precursor materials that can decompose at reaction conditions to provide elemental carbon for use in the CVD formation process.

The system 10 can also include a port 22 for inserting liquids into the system 10. For example, the port 22 can be an injection port, as is generally known in the art, for injecting liquids into the system 10. Optionally, port 22 can be located upstream of the furnace 12, and used to deliver liquids into the reactor via the carrier gas flow, or alternatively, port 22 can be at the preheater 14 or even at the reactor 16 and liquids can be injected directly into the furnace 12.

In general, the precursor materials supplied to the system can include materials that can decompose at reaction conditions to provide elemental source materials within the reactor 16. The elemental source materials can then interact with one another at the reactor conditions to form the desired nanostructures according to a CVD process. In general, one or more substrates 23 can be located in the reactor and the nanostructures can form on one or more surfaces of the substrate 23 for ease of collection.

Included among the precursor materials that can be supplied to the reactor can be at least one material that can decompose at reaction conditions to provide the elemental carbon for forming the carbon-based nanostructures. While, in various embodiments, the carbon source precursor materials can include a hydrocarbon that is a gas at atmospheric conditions, at least one carbon source precursor used in the process can be a carbon-containing material that is liquid at atmospheric conditions. A non-limiting exemplary listing of possible liquid materials suitable for use as carbon-source precursor materials can include xylene, benzene, toluene, tetramethylamine, and mixtures thereof. The carbon source that is a liquid at atmospheric conditions need not be limited to these particular hydrocarbons, however, and can be any suitable carbon-containing material that can be provided as a liquid at atmospheric conditions and can decompose in the furnace to provide the elemental carbon necessary for growth of the developing nanotubes. For instance, a carbon source for the process can include a carbon-containing material that may be a solid at atmospheric conditions that can be dissolved so as to be provided to the process in a liquid form.

According to one embodiment of the present invention, at least one of the carbon-containing precursor materials can be an organic solvent. As such, the carbon-containing precursor can also serve as a solvent for one or more of the other precursor materials that may otherwise be a solid at atmospheric conditions. For instance, in one embodiment, a precursor material that can decompose at reaction conditions to provide an elemental catalyst and/or an elemental dopant can first be dissolved in the organic solvent to form solution and the solution containing both precursor materials can be injected into the system such as via port 22.

Optionally, dissolution of solid precursor materials in a solvent can be facilitated by sonication of the mixture so as to provide the precursors in solution. For example, one or more precursor materials can be combined with an organic solvent and the mixture can then be sonicated in a warm water bath to facilitate dissolution of any solid precursor materials and form a liquid solution for injection into the system.

The carbon source materials can also include one or more carbon-containing precursor materials that are gaseous at atmospheric condition, such as acetylene, ethylene, or methane, or carbon monoxide, for example. A gaseous carbon-containing precursor can either be mixed with another gas, e.g., an inert carrier gas, or can completely form the carrier gas flow, and can enter the reactor in combination with other liquid precursor materials. Alternatively, a gaseous precursor can be provided to the reactor independently from any other liquid precursor materials. In those embodiments including a gaseous carbon-containing precursor, however, the gaseous carbon source will be only one carbon source, and the process will also include one or more carbon source precursors that can be provided as a liquid at atmospheric condition.

The precursor materials provided to the system can also include one or more materials that can be provided as liquid at atmospheric condition that can decompose in the preheater or the reactor to provide elemental sources for a catalyst that can nucleate the individual nanostructures.

In one embodiment, the catalyst-providing precursor materials can decompose to form the catalyst itself. For example, various possible precursor materials can be utilized that can be provided as a liquid and can decompose to form elemental metallic catalysts such as iron, cobalt, nickel, etc., that can initiate formation of the nanostructures in the reactor. For example, the catalyst-containing precursor material can be a solution of a metallocene, for instance a solution of ferrocene, cobaltocene, nickelocene, and the like, that can vaporize and decompose to provide elemental iron, cobalt, nickel, etc. that can then nucleate the nanostructures.

In another embodiment, more than one elemental catalyst source precursor can be provided to the process for forming a multi-component catalyst. For example, in one embodiment, the precursor materials can include two or more materials, each of which can be provided as liquid at atmospheric conditions and each of which can decompose in the preheater or the reactor to provide different elemental catalyst materials. Upon reaction of these elemental catalyst materials with each other, a multi-component catalyst, such as a bi-metal or doped catalyst, can be formed. The relative amount of each catalyst material present in a multi-component catalyst can, in one embodiment, depend upon the relative solubility of the two materials at the reaction conditions, although the proportional feed of the two materials can be determinate in other embodiments.

In an alternative embodiment, a single precursor can decompose to provide more than one of the elemental source materials found in the multi-component catalyst.

The utilization of a more complicated catalyst, for instance a bimetal catalyst, has been previously found to alter the shape of the nanostructures formed during the process. For example, use of a doped catalyst has been disclosed in a CVD process for forming branched nanostructures in co-owned U.S. patent application Ser. No. 10/829,660 to Rao, et al., which is incorporated herein by reference.

According to one particular embodiment of the present invention, the precursor materials can include ferrocene, which can decompose to provide elemental iron, and indium isopropoxide, which can decompose to provide elemental indium. The two precursors, ferrocene and indium isopropoxide, can be injected into the system together or separately, as desired. For instance, referring again to FIG. 1, the two liquids can be injected via two separate injectors both attached to port 22 or can be premixed and then fed to the system via a single injector at port 22. At reaction conditions, the precursors can decompose and a bi-metal catalyst comprising both iron and indium can be formed. According to the process, when elemental carbon is also provided at reaction conditions in conjunction with the Fe/In bi-metal catalysts, for example via decomposition of a combination of xylene and acetylene, nanostructures describing a helical coil along the axial length of the structure can form.

As the catalyst precursor materials can be provided as liquid at atmospheric conditions, it can be a simple process to alter the relative concentrations of the different materials that form the multi-component catalyst in order to better control the structural characteristics of the products. In particular, it has been found that the structural characteristics of the product nanostructures can vary depending on the relative amounts of elemental catalyst materials provided to the reactor during the process. In the particular embodiment described above for example, when the atomic percentage of the catalyst components that is indium is about 65%:

$$[In]/([In]+[Fe]) \approx 0.65$$

the disclosed process can provide gram quantities of highly oriented HCNT, such as those that can be seen in FIGS. 4A-4D. In contrast, when the same general formation process is used, but the atomic percentage of the catalyst components that is indium is raised to about 75%, the product nanostructures are primarily HCNW, such as those shown in FIGS. 5-6. When the relative atomic percentage of indium in the precursor materials is between about 65% and about 75%, a mixture of HCNT and HCNW is obtained, with the percentage of HCNW in the product increasing as the relative atomic percentage of indium increases.

As the catalyst-providing precursor materials can be provided to the system in a liquid form, the relative concentrations of the catalysts at reaction conditions can be easily and rapidly altered according to the present invention. Moreover, the process provides for the alteration of the catalyst materials during the formation process itself, providing possible routes to the formation of nanostructures that alter in structure along the axial length or alternatively providing routes to the formation of nanostructure mats that alter in structure across their depth. For example, in one embodiment, a process, such as that described above, can be used to form a high purity mat of HCNT. Following a period of formation of the mat, such that the mat defines a desired depth, the relative proportion of the liquid precursor materials can be altered, and a second layer of HCNW can be formed on top of the first layer.

Generally, any transition metal catalyst as is known in the art can be utilized alone or in combination in the disclosed processes. Methods for examining variations of process conditions and variations of relative proportions of catalyst precursors are well within the knowledge of one of ordinary skill in the art, and thus are not discussed at length herein.

In one embodiment of the invention, a precursor material can be provided as a liquid and applied directly to the substrate 23, for example prior to location of the substrate in the reactor 16. For instance, in one embodiment, a solution of iron nitrate can be formed through dissolution of a few (e.g., less than about 10) milligrams of the metal salt in about 10 ml of a suitable hydrocarbon solvent, for example in isopropyl alcohol. Following formation and prior to the reaction, the solution can be applied to the substrate, for example by simply dipping the substrate into the solution. As the substrate is heated in the reactor, the precursor can decompose, leaving, in this particular embodiment, an iron catalyst on the substrate. Upon decomposition of the vaporized carbon-containing precursor at the reaction conditions, carbon-based nanostructures can nucleate and grow on the substrate. In this particular embodiment, in which an iron-containing liquid precursor is deposited on the substrate, and the carbon source materials include a carbon-containing precursor that is a liquid at atmospheric conditions, individual, pristine SWNT can develop on the substrate. An iron catalyst is not a requirement in this particular embodiment, however, and in other embodiments, isolated SWNT can be formed according to the process following deposition of different catalyst-containing liquid precursors on the substrate, including upon deposition of a mixture of catalyst-containing precursors, for instance a mixture of iron and cobalt acetates. In other embodiments, other catalysts can be utilized, other than iron and/or cobalt, for forming isolated SWNT as herein described.

In addition, it has been found that the concentrations of the precursor materials provided to the process according to this particular embodiment can be used to control the characteristics of the product materials. For example, depending upon the concentration of the liquid catalyst-containing precursor applied to the substrate surface, variation in the coverage of the isolated nanotubes on the substrate surface can be controlled. In particular, the percentage coverage of the isolated nanotubes on the substrate has been found to be proportional to the concentration of the catalyst-providing precursor present in the liquid solution that is applied to the substrate prior to the formation process as herein described.

Beneficially, catalysts can be provided to the process in certain embodiments at levels lower than those of many previously known CVD nanostructure formation processes. In particular, whether a catalyst is provided in the reactor through either simple decomposition of a single catalyst-providing precursor or optionally through decomposition of one or more precursors followed by combination of elemental source materials to form multi-component catalysts, the catalyst can be provided at lower levels than previously known CVD processes. For example, according to some embodiments, a single metallic catalyst, such as elemental iron, for example, can be supplied to the reactor at an atomic percentage of between about 0.2 at. % and about 0.7 at. %. It has been found that in some embodiments, by utilizing lower atomic percentages of metallic catalyst than was generally utilized in the past, the catalyst-containing precursor material can exhibit improved dissolution characteristics in a solvent. In addition, at lower concentration levels, the tendency of a catalyst-containing precursor material to precipitate out of solution can be prevented.

Of course, in other embodiments, an elemental catalyst can be provided to the system at higher concentrations. For example, an elemental catalyst can optionally be provided to the reactor at concentrations greater than about 0.7 at. %, such as at about 0.75 at. %, or even higher, in some embodiments.

According to the present invention, in addition to the carbon sources and catalyst-containing precursors discussed above, an additional precursor material including a dopant can be provided to the reactor during the process.

Similar to the other precursor materials, and referring again to FIG. 1, a dopant can be supplied to the reactor 16 in one embodiment in a liquid form, e.g., as a solution component that can decompose in the preheater or the reactor and can provide an elemental dopant in the reactor. A non-limiting list of nanostructure dopants that can be incorporated into nanostructures according to the present invention can include, for example boron, nitrogen, and sulfur. For example, in one embodiment, elemental boron can be supplied at reaction conditions via injection of o-carborane dissolved in a suitable solvent into the reactor 16 at or upstream of the furnace 12. In another embodiment, o-carborane powder can be sublimed and the vapors can be directed into the furnace 12. For instance, a sublimation cell could be coupled to quartz substrate 23 according to methods as are generally know to one of ordinary skill in the art. Similarly, a solution of acetonitrile can provide elemental nitrogen to the reactor for nitrogen doping of the nanostructures formed according to the process. Other dopant-providing precursors can generally include any material that contains the dopant, can be provided to the reactor, and can decompose to provide the elemental dopant at reaction conditions.

The dopants can be taken up into the nanostructures either external to the nanostructure walls or as substitutional dopants. For example, in certain embodiments that produce multi-walled structures, such as multi-walled HCNT or SWNT bundles, dopant take-up during the process can lead to exohedral doping, endohedral doping, or interstitial doping, all of which can involve the location of a dopant adjacent to the nanostructure wall and held via bond formation, electrostatic attraction, or the like between the dopant and the carbon structure forming the wall.

The process can also provide a relatively simple route to formation of a substitutionally doped nanostructure, i.e., a nanostructure in which the elemental dopant is incorporated directly into the wall of the nanostructure. For instance, in those embodiments including the formation of either isolated SWNT or SWNT bundles, addition of a dopant-providing precursor material to the system can produce substitutionally doped SWNT. Moreover, according to this particular embodiment, the amount of dopant taken up in the walls of the SWNT can be proportional to the relative amount (i.e., atomic percentages) of elemental carbon and dopant provided in the process.

Referring again to FIG. 1, according to this particular embodiment, the precursor materials can be provided to the preheater 14, either together or separately, as desired, where they can be mixed, heated, vaporized if injected as a liquid, or carried in to the reactor 16. When considering multiple miscible liquid precursor materials, the precursors can be premixed and injected together into the system via a single injector. When liquid precursor materials are not miscible, however, they should be injected into the system separately. For example, in those embodiments wherein the elemental dopant and/or catalyst are provided in an aqueous solution, they can be injected separately from an organic carbon-containing liquid precursor. Optionally, a single port can be used in conjunction with two or more injectors or separate ports can be used for separate injectors. Of course, miscible liquid materials can also be injected into the system separately, if desired, for instance to more easily vary relative amounts of the precursors during the process.

During processing, a preheater 14 can generally be heated to a temperature that is equivalent to or even less than preheat temperatures previously known in the art. For example, according to certain embodiments of the present invention, the preheater 14 can be heated to a temperature of about 250° C. In other embodiments, however, a lower temperature can be used in the preheater 14. In certain embodiments of the invention, a lower temperature in the preheater 14 has been found to reduce or eliminate problems associated with the precipitation of one or more of the precursor materials out of solution. According to this particular embodiment, the preheater 14 can be heated to a temperature of less than about 200° C. For instance, the preheater 14 can be heated to between about 125° C. and about 190° C. In one embodiment, the preheater 14 can be heated to between about 125° C. and about 175° C. In one particular embodiment of the present invention, the process temperature of the preheater 14 can be about 150° C.

The conditions in the reactor during the disclosed processes can generally be equivalent to those of other CVD nanostructure formation processes as are known in the art. For example, reactor 16 can be heated to a temperature between about 650° C. and about 850° C. according to one embodiment of the disclosed invention. For instance, the reactor 16 can be heated to a temperature between about 700° C. and about 850° C. In one embodiment, the reactor 16 can be heated to a temperature between about 650° C. and about 750° C. In one particular embodiment, the reactor 16 can be heated to a temperature of about 750° C. Within the reactor 16, nanotubes can grow spontaneously on a substrate 23, for instance a quartz substrate 23, or any other suitable substrate material as is generally known in the art including, for example, $SiO_2$/Si substrates, sapphire substrates, or alumina substrates.

The disclosed methods can be utilized to provide nanostructures with highly tailored, predetermined characteristics, including electrical as well as structural characteristics. Moreover, the disclosed process can easily and economically provide the highly tailored materials in bulk. As such, the process can provide highly tailored nanostructures for use in secondary products. Accordingly, the present invention is also directed to products incorporating the disclosed highly tailored nanostructures.

For instance, upon examination of nanostructures formed according to the present invention, it has been discovered that the materials can posses previously unrecognized and/or previously uncontrollable electrical characteristics depending upon, for example the dopant used, the catalyst used, the relative proportions of precursor materials used, the particular carbon sources used, and the like.

Figure 7:
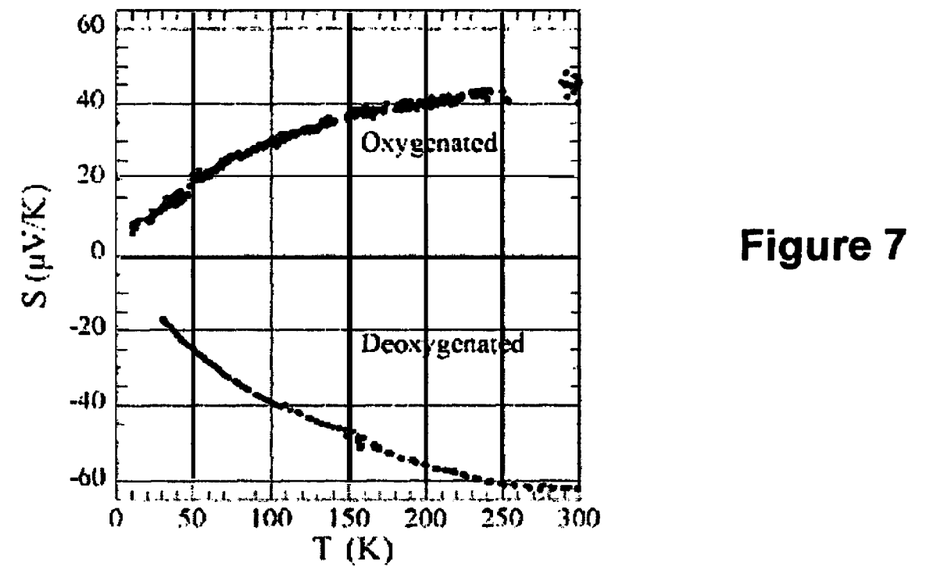
FIG. 7 graphically illustrates the known changes in thermoelectric power demonstrated by pristine SWNT upon oxygen adsorption.

For example, it has been discovered that doped SWNT formed according to the present invention can exhibit sustainable p-type or n-type electrical characteristics. In particular, it has been found that boron-doped SWNT formed according to the present invention can exhibit sustainable p-type characteristics, and nitrogen-doped SWNT formed according to the present invention can exhibit sustainable n-type characteristics. This is in contrast to what was understood about SWNT in the past. In the past, pristine SWNT have been shown to demonstrate dramatic changes in thermoelectric power due to oxygen adsorption, as is shown in FIG. 7 and further described by Bradley et al. (Physical Review Letters, 85, 4361 (2000), which is incorporated herein by reference). In particular, devices formed in the past based on as-grown isolated SWNT have invariably exhibited p-type behavior, and while degassing can lead to n-type characteristics, the p-type characteristics are recovered upon exposing the device to atmospheric conditions. According to the present invention, devices are disclosed including nanostructures that can exhibit sustained p-type or sustained n-type behavior at atmospheric conditions.

According to one embodiment of the present invention, disclosed are nano-sized transistors and diodes that can maintain their function at atmospheric conditions. Other devices encompassed by the invention can include nanotube-based complementary logic circuits that include both p-type as well as n-type carbon nanotube field effect transistors (CNFET) and that can exhibit the desired p-type or n-type characteristics, i.e., maintain the electrical characteristics of the device, under any desired operating conditions, and in particular, operating conditions including a relatively high oxygen content, e.g., atmospheric conditions. For example, one embodiment of a CNFET suitable for use in atmospheric conditions according to the present invention can include a drain and a source formed of any suitable material (e.g., gold, titanium, lead), a channel between the drain and the source formed of a p-type or n-type SWNT, as desired, and a gate (e.g., Si/SiO2). Any suitable variations in FET formation and organization are encompassed by the present invention. Such variations are generally known to one of ordinary skill in the art, and as such are not addressed in detail herein.

The present invention is also directed to products including nanostructures that can exhibit other tightly controlled, predetermined electrical characteristics, in addition to electron donating/withdrawing characteristics. For example, depending upon the precursors utilized as well as depending upon the relative amounts of precursors utilized in forming the disclosed materials, the products can exhibit varying electrical characteristics, such as conductivity, for example. Thus, with relatively little experimentation, nanostructures exhibiting particular electrical characteristics can be developed for a particular application.

Figure 8:
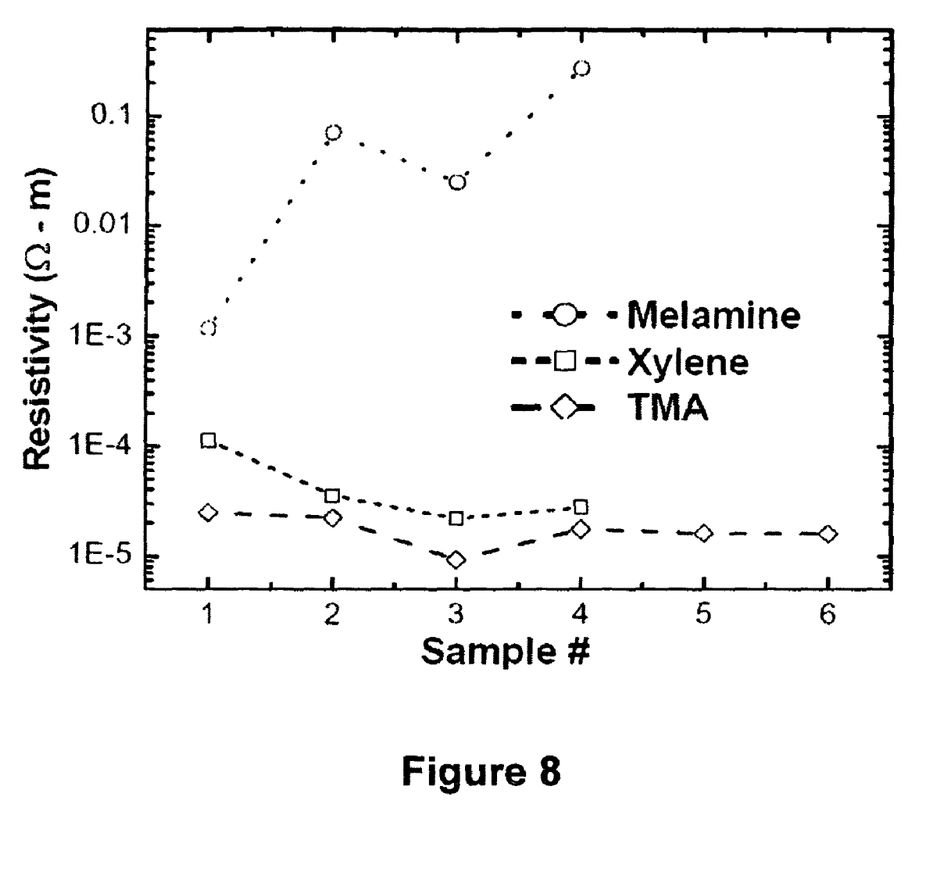
FIG. 8 graphically illustrates the difference in electrical properties of SWNT formed from different carbon source precursors.

For instance, FIG. 8 graphically illustrates differences in resistivity obtained for isolated pristine SWNT formed according to the presently disclosed process. As can be seen, by merely varying the particular carbon source used in the process, different materials can be formed, and in particular, materials exhibiting different electrical characteristics can be formed for use in various applications.

Products encompassed by the present invention also include those that incorporate nanostructures particularly tailored as to their physical characteristics. For example, in one embodiment, the present invention is directed to products incorporating helically-coiled nanostructures, for instance as nanosprings, nano-sized electrical connectors, inductors, and/or nano-cantilevers, all of which can benefit from the physical play allowed due to the coiled structure.

Due to the reliable mechanical characteristics of carbon nanostructures (better than those of silicon, for example), the presently disclosed materials can be utilized to form strong reinforced composite materials. For example, in one embodiment, the disclosed helically-coiled nanostructures can be dispersed in a matrix, for example, a polymeric matrix material such as an adhesive or a structural matrix, prior to final set of the material so as to reinforce and strengthen the formed, cured matrix material. In one particular embodiment, the coiled shape of the nanostructures can provide a better interlock within a composite matrix as compared to a straight structure or as compared to the pure matrix. Exemplary matrix materials that could be structurally reinforced through formation of a composite material including a plurality of the disclosed helically-coiled nanostructures can include, for instance, poly(methyl methacrylate) (PMMA), Polypropylene resin (PP), polyacrylonitrile (PAN), polyvinyl alcohol (PVA), polystyrene (PS), polyethylene-butene (PE-B), ultra-high molecular weight polyethylene (UHMWPE), methylethyl methacrylate copolymer (PMEMA), and the like.

The disclosed invention can be better understood with references to the following examples.

Example 1

About 1.5 mg of iron (III) nitrate nonahydrate powder was dissolved in 10 ml of 2-propanol. Bare substrates (quartz, $SiO_2$/Si) were dip-coated in this solution for 10 sec. followed by a quick rinse in n-hexane for 1 sec. Following, the substrates were dried in air at room temperature. The precursor-coated substrates were inserted into a quartz tube reactor similar to that illustrate in FIG. 1, and xylene was injected into an argon gas flow to provide the carbon source for a CVD process.

Figure 2A:
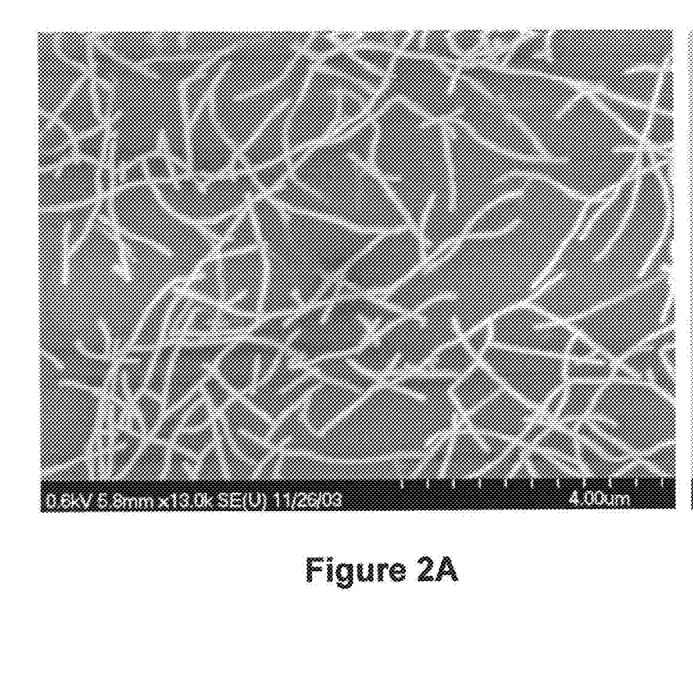
FIGS. 2A and 2B are SEM images of isolated, individual SWNT formed according to one embodiment of the invention.
Figure 2B:
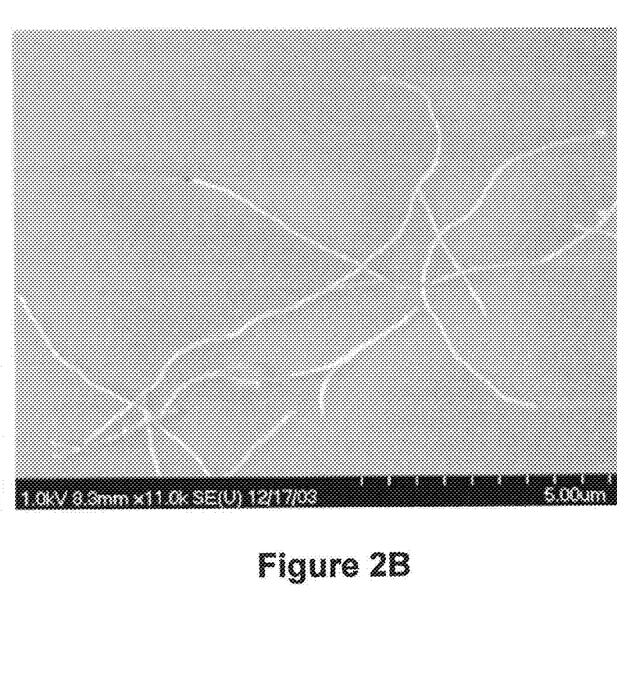

The SEM images obtained from as-grown pristine SWNT prepared on quartz substrates using 1.5 mg of iron nitrate in 10 ml and 30 ml of isopropanol are shown in FIGS. 2A and 2B, respectively. The images clearly reveal the presence of isolated SWNTs on the substrates. The scale bar in the Figures should be used with caution since the residual charging effects make isolated SWNT appear thicker than the true diameter. As discussed below, from the position of the radial breathing mode frequency (RBM), it was estimated that the tube diameters were in the range from 1.33-1.75 nm. It was clear from the SEM images that the coverage of isolated nanotubes on the substrates was proportional to the concentration of iron nitrate present in the solution. As expected, when the catalyst-containing solution was diluted with 30 ml isopropanol, the nanotube coverage on the substrate decreased drastically as compared to the coverage obtained with 10 ml isopropanol solution.

Following formation of the pristine, isolated SWNT, a xylene-acetonitrile (nitrogen source) mixture was introduced to the reactor using a syringe pump at a flow rate of 1 ml/h for 2.5 hr after the reactor had reached 750° C. The vapors of xylene and acetonitrile were carried by a gas flow (argon-hydrogen mixture: 600 sccm Ar, 400 sccm $H_2$) into the reactor. Multiple runs were performed in which the SWNTs were doped with nitrogen by co-injecting varying, controlled amounts of acetonitrile (1-33 at. % nitrogen) with the xylene. The as-grown nitrogen-doped SWNTs were characterized by SEM (Hitachi, S-3500N), STEM (HD 2000 Hitachi) and micro-Raman spectroscopy (Leica microscope, ISA Triax 550).

Figure 3A:
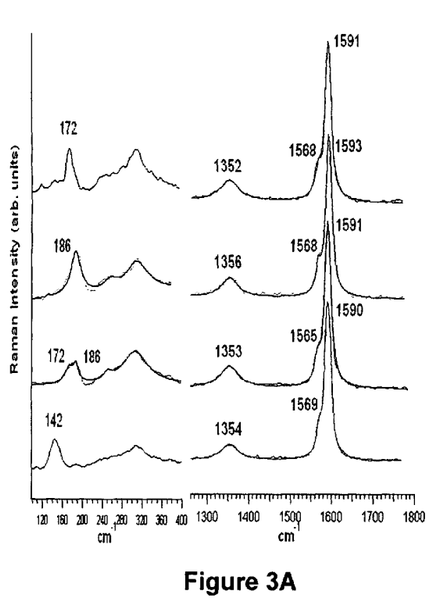
FIGS. 3A and 3B are micro-Raman spectra of isolated pristine and nitrogen-doped single-walled carbon nanotubes formed according to one embodiment of the present invention.
Figure 3B:
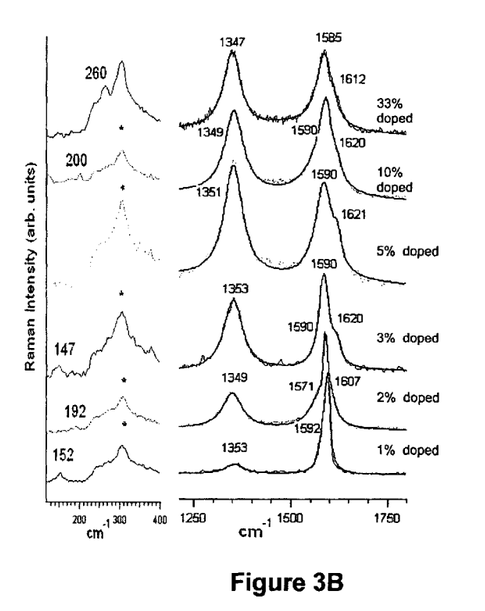

The room temperature micro-Raman spectra of isolated pristine and nitrogen-doped SWNTs excited with the 514.5 nm photons from an Ar ion laser are presented in FIGS. 3A and 3B, respectively. The doping concentrations listed in FIG. 3B correspond to the acetonitrile concentration in the xylene-acetonitrile feed. Peaks corresponding to the radial breathing modes can be seen signifying the presence of pristine or nitrogen-doped isolated SWNTs on the substrates. The RBM mode frequencies ranged from 140-190 $cm^{-1}$ indicating that isolated tubes with varying diameters (ranging from 1.33-1.75 nm in diameter) are present on the substrate. The nanotube diameters were estimated using the relation $d_t=248/\omega_{RBM}$, where $d_t$ and $\omega_{RBM}$ refer to the tube diameter and the RBM mode frequency, as taught by Dresselhaus, et al. ("Raman spectroscopy on isolated single wall carbon nanotubes", Carbon 2002, 40, 2043-2061, which is incorporated herein by reference). Lorentzian line-shape analysis of the Raman spectra in the vicinity of the RBM suggested that the SWNTs are isolated, and the intensity of the RBM is comparable to that of the Si 303 cm$^{-1}$ peak. The line-shape of the G-band in each spectrum of pristine SWNTs suggests that the 514.5 nm excitation couples to isolated SWNTs and the D-band intensity is small compared to that of the G-band.

As the nitrogen concentration in the feed was increased from 1-33 at. %, the RBM intensity decreased dramatically relative to the 303 cm$^{-1}$ peak of Si. Concomitantly, the intensity of the disorder-induced D-band at ~1350 cm$^{-1}$ grew in intensity (relative to the G-band intensity) hinting that the increasing presence of nitrogen in the feed is in fact bringing about a noticeable change in the degree of long range ordering in the hexagonal lattice of the nanotube (FIG. 2B). This increase in the intensity of the D-band is attributed to the activation of off-zone-center phonons due to relaxation of the strict selection rules for Raman scattering due to a double resonance process. Interestingly, the D*-band at ~1620 cm$^{-1}$ (FIG. 3B) was observed for the first time in the Raman spectrum of carbon nanotubes when the nitrogen concentration reached ~2-3 at. %.

The Raman features that were most affected due to the nitrogen doping included the intensity of RBM, which is much lower in nitrogen-doped SWNT as compared to the pristine SWNT. It is believed that the nitrogen dopant hinders the collective in-and-out movement of the carbon atoms (breathing mode) in the nanotube. Also strongly affected due to the nitrogen doping were the modes associated with defects in the lattice, i.e. D-band and D*-bands become strongly Raman active with increasing nitrogen concentration in the feed. Collectively, the data set in FIG. 3 provides support for nitrogen substitution in the nanotube network.

To elucidate the elemental composition of the doped carbon nanotubes, silicon substrates coated with a mixture of isolated and bundled SWNTs were embedded in LR White resin, polymerized and sectioned using an Ultra-cut E Microtome. Sections were 90-120 nm thick. The measured average length of the bundles was ~10-20 μm and an average diameter of ~3 nm. Due to the difficulty involved with the detection of light elements in energy dispersive spectral (EDS) analysis, small diameter SWNT bundles were prepared from the same feed used for preparing isolated tubes discussed in FIG. 3. The EDS spectrum was recorded from a single nanotube or small bundles of nitrogen-doped carbon nanotubes prepared from decomposition of xylene-acetonitrile solution containing 33 at. % nitrogen. The typical carbon K and the nitrogen K peaks were observed at 290 eV and 401 eV, respectively and the average nitrogen content was estimated to be about 21 atomic %.

Example 2

A two-stage CVD reactor similar to that schematically illustrated in FIG. 1 was used for preparing HCNTs or HCNWs on bare quartz substrates. A combination of xylene and acetylene served as the carbon source. A xylene-ferrocene mixture was formed including an atomic concentration of Fe fixed between 0.75 and 1 at. %. Indium isopropoxide was dissolved in the xylene-ferrocene mixture. The relative concentration of Indium isopropoxide was varied systematically to yield bi-metal catalyst particles with varying catalysts compositions R=In/(In+Fe). Acetylene at a flow rate of 50 sccm and argon at a flow rate of 800 sccm were fed into the system during the synthesis. The xylene/ferrocene/ indium isopropoxide mixture was continuously injected into the CVD reaction tube at the rate of 1 ml/hr. The reaction temperature was held at about 700° C. After 1-hour reaction, the syringe pump and acetylene injection were shut off and the CVD reactor was allowed to cool to room temperature under flowing argon atmosphere. Various parameters, such as the reactor temperature, gas flow rate, concentration of iron and indium were adjusted to optimize the synthesis condition. Scanning electron microscopy (SEM) (Haitachi S-4700, 20 KV) and transmission electron microscopy (TEM) (Hitachi HD-2000, 200 KV) were employed to explore the structure and morphology of the as-grown HCNTs and HCNWs.

Figure 4A:
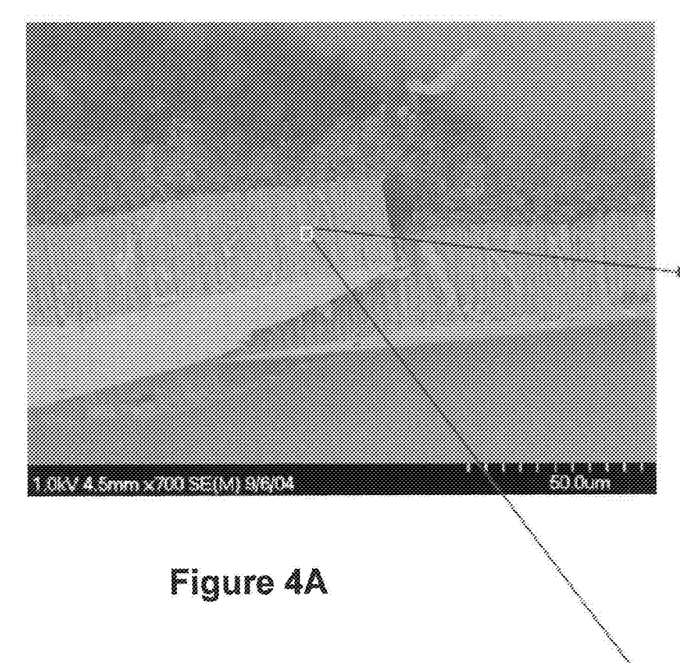
FIGS. 4A-4D are images of helically-coiled nanotubes (HCNT) formed according to one embodiment of the invention.
Figure 4B:
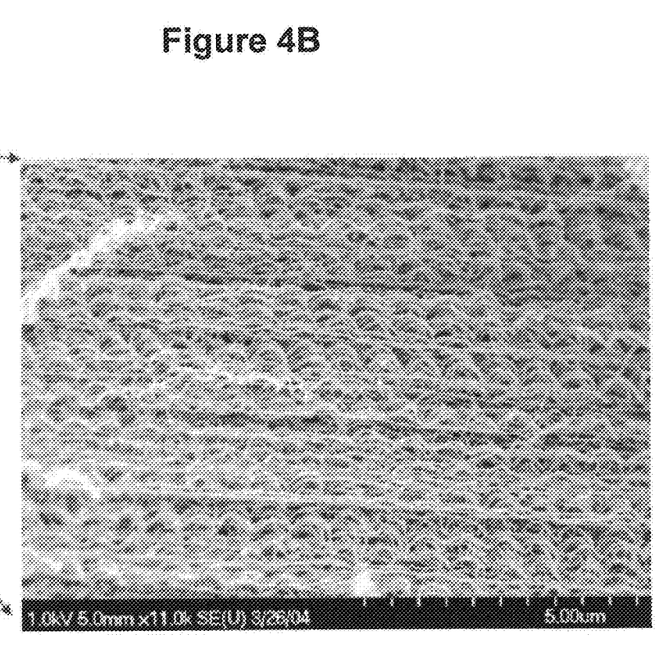
Figure 4C:
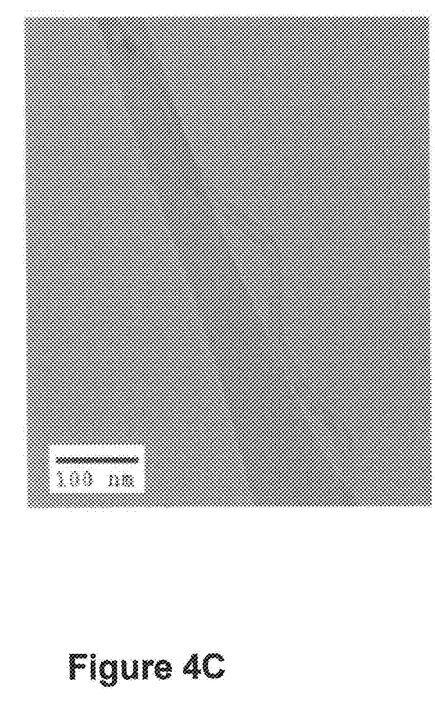
Figure 4D:
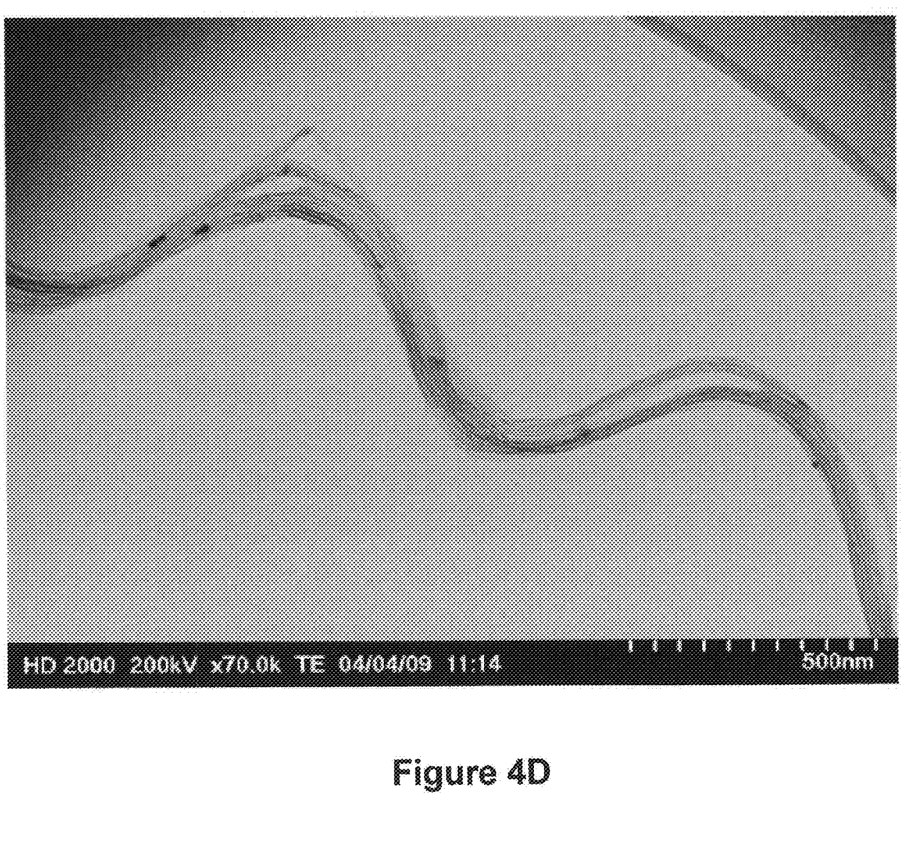

Growth of HCNT was favored when R was about 65%. FIG. 4A shows a typical SEM image of an as-grown HCNT film that was peeled from the quartz substrate. High purity HCNT were densely packed and oriented normal to the surface of substrate. The high degree of orientation can be appreciated from the middle section of the HCNT array as seen in FIG. 4B. FIG. 4C is a TEM image of a single isolated HCNT, in which the hollow core is clearly visible. FIG. 4D is an SEM image of a small bundle of HCNT formed in the process, and again, the hollow cores of the individual nanotubes are clearly visible. The individual tube diameters ranged between 15 to 25 nm and the coiled pitch was about 1 μm. Many tubes showed the presence of catalyst particles trapped either between the tube walls or within the walls themselves, as can be seen with reference to FIG. 4D. This was expected since both ferrocene and indium precursors were fed continuously during the growth of HCNT.

Figure 5:
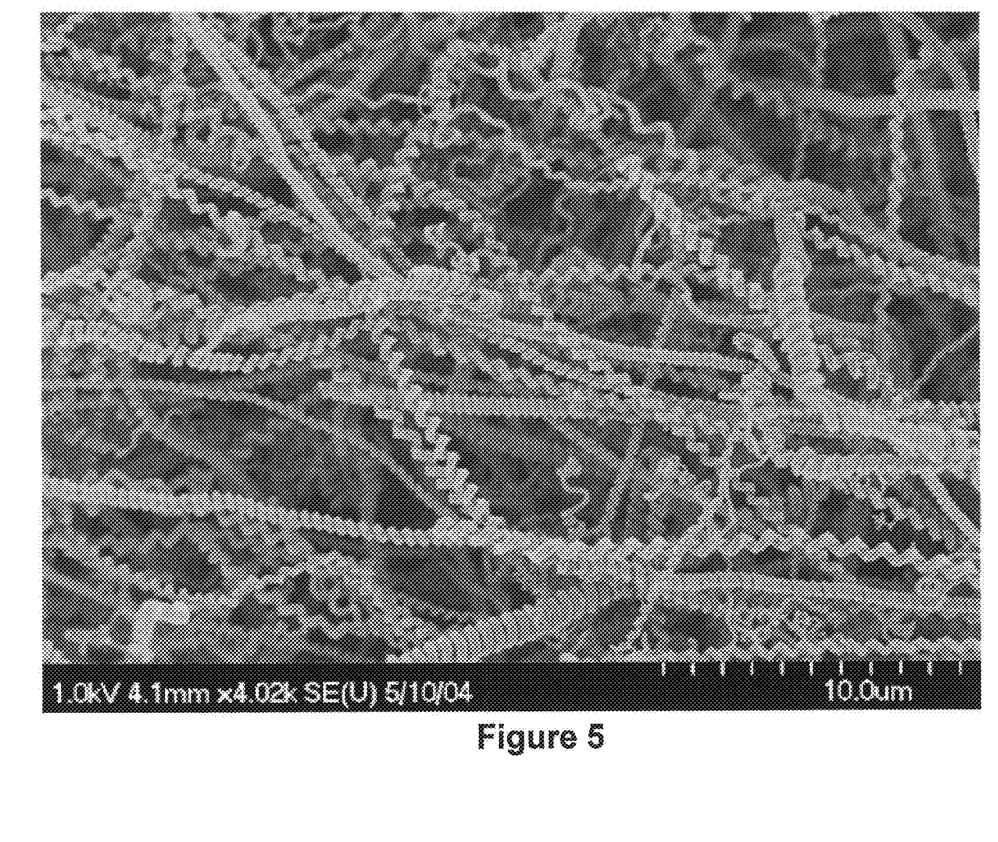
FIG. 5 is an SEM image of helically-coiled nanowires (HCNW) formed according to one embodiment of the invention.
Figure 6:
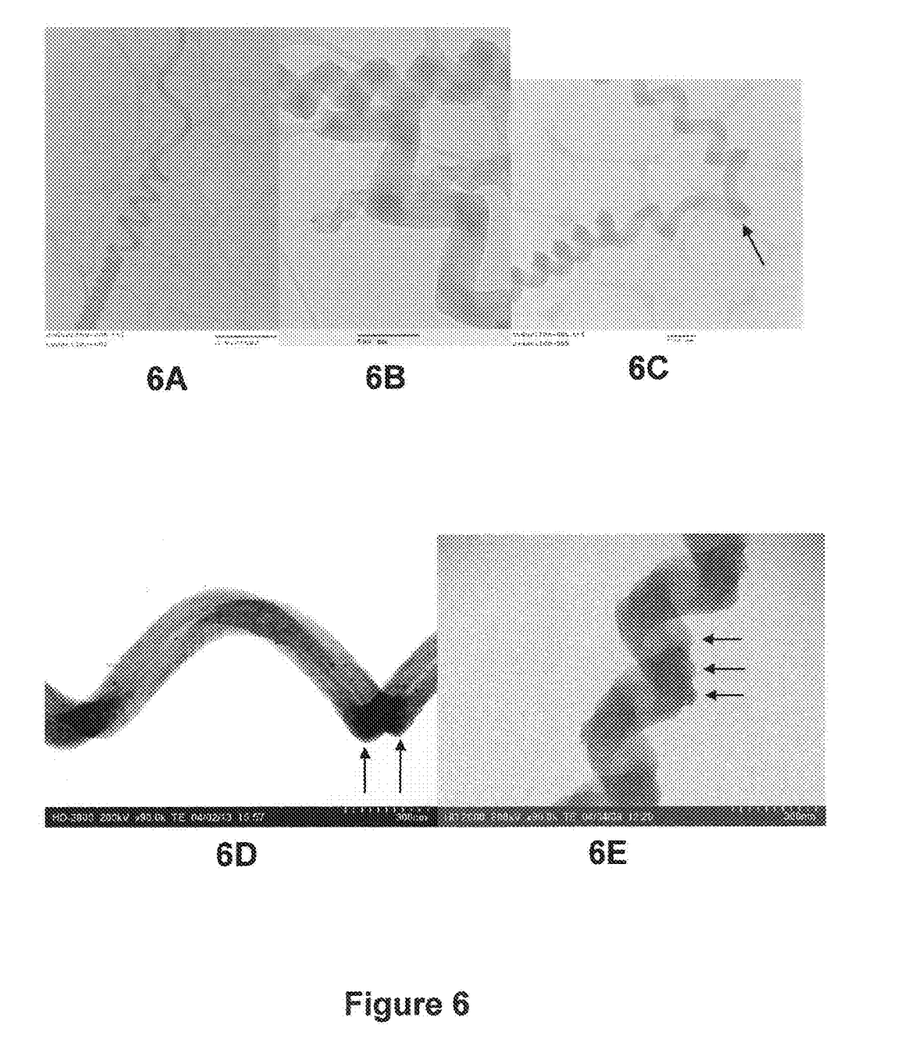
FIGS. 6A-6E are images of as-grown HCNW formed according to one embodiment of the invention.

The as-synthesized coiled nanowires as shown in FIG. 5 were also prepared with high purity and with very little presence of amorphous carbon nanoparticles. The transition from HCNT to HCNW occurred when R reached a value of about 75%. FIG. 6A is an SEM image of typical as-grown HCNW. Unlike the HCNT that grew in an ordered array, the orientation of the HCNW was random. The diameters and coiled pitches of the as-grown HCNW varied from several tens to few hundreds of nanometers. The length of HCNW were found to be as long as several tens of microns. Individual HCNW were also found to alter both diameter and pitch along the axial length of the nanowires. Individual nanowires were also found that altered chirality, for instance, from right to left-handedness. FIGS. 6A-6C are TEM images illustrating various formation characteristics of the as-formed HCNW.

The HCNW could also be found in combination, for instance with two or more HCNW forming intertwined nanostructures as shown in FIGS. 6D and 6E. FIG. 6D shows two HCNW with nearly identical diameters and pitches that are wound together. An example of three intertwined HCNW is shown in FIG. 6E. The arrows in each of the TEM images in FIGS. 6D and 6E indicate the individual HCNW.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A method for forming carbon-based nanostructures comprising:
    providing to a reactor a liquid containing an elemental catalyst precursor, the liquid containing the elemental catalyst precursor being provided to the reactor as a liquid and at atmospheric condition, wherein the liquid contains the elemental catalyst precursor in a concentration of less than about 10 mg precursor per 10 milliliters of the liquid;

providing to the reactor a liquid containing an elemental carbon-precursor, wherein the liquid containing the elemental carbon precursor is provided to the reactor in an unobstructed flow as a liquid and at atmospheric condition;

vaporizing in the reactor the liquid containing the elemental catalyst precursor and the liquid containing the elemental carbon-precursor;

decomposing the elemental catalyst precursor and the elemental carbon precursor, wherein upon the decomposition, elemental carbon and elemental catalyst are provided in the reactor; and forming a plurality of only isolated, single-walled carbon nanotubes according to a chemical vapor deposition process in the reactor.

2. The method according to claim 1, further comprising locating a substrate in the reactor, wherein the liquid containing the elemental catalyst precursor is applied to the substrate prior to vaporizing the liquid containing the elemental catalyst precursor.

3. The method according to claim 1, the method further comprising providing a second elemental carbon precursor to the reactor.

4. The method according to claim 3, wherein the second elemental carbon precursor is a gas at atmospheric conditions.

5. The method according to claim 1, the method further comprising forming a single solution comprising the elemental catalyst precursor and the elemental carbon precursor, and providing the elemental catalyst precursor and the elemental carbon precursor to the reactor in this single solution in an unobstructed flow.

6. The method according to claim 1, wherein the liquid containing the elemental carbon precursor, and the liquid containing the elemental catalyst precursor are immiscible at atmospheric conditions.

7. The method according to claim 1, wherein the liquid containing the elemental carbon precursor is selected from the group consisting of xylene, benzene, toluene, and mixtures thereof.

8. The method according to claim 1, wherein the elemental catalyst is iron, cobalt, nickel, or indium.

9. The method according to claim 1, wherein at atmospheric condition, the liquid containing the elemental catalyst precursor is a solution comprising a solvent, the solvent being identical to the elemental carbon precursor.

10. The method according to claim 1, wherein the elemental catalyst is a transition metal.

11. The method according to claim 1, wherein the elemental catalyst is supplied to the reactor in the liquid containing the elemental catalyst precursor at an atomic percentage of between about 0.2 at % and about 0.7 at % of this liquid.

12. A method for forming carbon-based nanostructures comprising:

providing to a reactor a liquid containing an elemental catalyst precursor the liquid containing the elemental catalyst precursor being provided to the reactor as a liquid and at atmospheric condition, wherein the liquid contains the elemental catalyst precursor in a concentration of less than about 10 mg precursor per 10 milliliters of the liquid;

providing to the reactor a liquid containing an elemental carbon precursor, wherein the liquid containing the elemental carbon precursor is provided to the reactor in an unobstructed flow as a liquid and at atmospheric condition;

providing to the reactor a liquid containing an elemental dopant-precursor, wherein the liquid containing the elemental dopant precursor is provided to the reactor as a liquid and at atmospheric condition;

vaporizing in the reactor the liquid containing the elemental catalyst precursor, the liquid containing the elemental carbon precursor, and the liquid containing the elemental dopant precursor;

decomposing the elemental catalyst precursor, the elemental dopant precursor and the elemental carbon precursor, wherein upon decomposition, elemental carbon, elemental dopant, and elemental catalyst are provided in the reactor; and forming a plurality of isolated doped single-walled carbon nanotubes according to a chemical vapor deposition process in the reactor.

13. The method according to claim 12, further comprising locating a substrate in the reactor, wherein the liquid containing the elemental catalyst precursor is applied to the substrate prior to vaporizing the liquid containing the elemental catalyst precursor.

14. The method according to claim 12, wherein the doped carbon-based nanostructures comprise substitutionally doped single-walled carbon nanotubes.

15. The method according to claim 12, wherein the elemental dopant is boron, nitrogen, or sulfur.

16. A method for forming carbon-based nanostructures comprising:

providing to a reactor a first precursor comprising an iron catalyst, wherein the first precursor is provided to the reactor in a liquid, and the liquid is provided to the reactor at atmospheric condition;

providing to the reactor a second precursor comprising an indium catalyst, wherein the second precursor is provided to the reactor in a liquid, and the liquid is provided to the reactor at atmospheric condition;

providing to the reactor a liquid containing an elemental carbon precursor, wherein the liquid containing the elemental carbon precursor is provided to the reactor as a liquid and at atmospheric condition;

vaporizing in the reactor the liquid provided thereto;

decomposing in the reactor the first precursor, the second precursor and the elemental carbon precursor, wherein upon decomposition, elemental carbon, iron, and indium are provided in the reactor on a bare substrate; and forming a plurality of helically-coiled carbon-based nanostructures on the substrate according to a chemical vapor deposition process in the reactor.

17. The method according to claim 16, wherein the helically-coiled nanostructures comprise helically-coiled nanotubes.

18. The method according to claim 16, wherein the helically-coiled nanostructures comprise helically-coiled nanowires.

19. The method according to claim 16, wherein the carbon-based nanostructures are isolated single-walled carbon nanotubes.

20. The method according to claim 16, wherein the only catalysts of the method are indium and iron.

* * * * *